United States Patent [19]

Bracey

[11] 4,034,030

[45] July 5, 1977

[54] OXYGENATION IMPREGNATION APPARATUS

[75] Inventor: Jep T. Bracey, Shepherd, Tex.

[73] Assignee: Martin L. Towler, Galveston, Tex.

[22] Filed: Sept. 10, 1975

[21] Appl. No.: 611,907

Related U.S. Application Data

[63] Continuation of Ser. No. 420,214, Nov. 29, 1973, abandoned, which is a continuation-in-part of Ser. No. 385,056, Aug. 2, 1973, Pat. No. 3,903,636, which is a continuation of Ser. No. 202,839, Nov. 29, 1971, abandoned.

[52] U.S. Cl. .................... 261/64 D; 119/3; 210/220; 261/119 R; 261/123; 261/125
[51] Int. Cl.² .......................................... B01F 3/04
[58] Field of Search ............ 261/64 D, 119 R, 91, 261/121 R, 122, 123, 121 M, 29, 36, DIG. 75, 125; 119/3, 5; 43/56; 210/220, 219

[56] References Cited

UNITED STATES PATENTS

| 1,514,939 | 11/1924 | Wallace | 261/64 D |
| 2,824,728 | 2/1958 | Crawford | 261/119 R |
| 3,246,761 | 4/1966 | Bryan et al. | 261/121 R X |
| 3,320,928 | 5/1967 | Smith | 119/3 |
| 3,503,593 | 3/1970 | Nelson | 261/29 |
| 3,506,541 | 4/1970 | Snelling | 261/123 X |
| 3,547,811 | 12/1970 | McWhirter | 210/220 X |
| 3,683,627 | 8/1972 | Girden | 261/123 X |
| 3,794,303 | 2/1974 | Hirshon | 261/123 X |
| 3,826,742 | 7/1974 | Kirk et al. | 261/119 R X |
| 3,903,636 | 9/1975 | Bracey | 43/56 |

Primary Examiner—Tim R. Miles
Assistant Examiner—Richard L. Chiesa
Attorney, Agent, or Firm—Richards, Harris & Medlock

[57] ABSTRACT

An apparatus for dissolving oxygen in a body of water having a housing submerged in a body of water. A chamber in the housing containing a volume of oxygen in surface contact with the water. An apparatus for supplying oxygen to the chamber at a rate equal to the rate at which oxygen is absorbed by the water.

2 Claims, 8 Drawing Figures

OXYGENATION IMPREGNATION APPARATUS

This is a continuation of application Ser. No. 420,214, filed Nov. 29th, 1973, now abandoned which is a continuation-in-part of application Ser. No. 385,056, filed on Aug. 2, 1973, now U.S. Pat. No. 3,903,636, which is a continuation of application Ser. No. 202,839, filed on Nov. 29, 1971, now abandoned.

BACKGROUND OF THE INVENTION AND SUMMARY OF THE PRIOR ART

The present invention relates to improved apparatus and methods for dissolving oxygen in water. More particularly, the present invention relates to dissolving oxygen in a large body of water.

In the rearing of fish, in impoundments for commercial and recreational purposes, it has been found that fish have environmental conditions which must be provided to insure their maximum growth and survival in impoundments. Water temperature and oxygen content are critical environmental conditions. Although each species of fish has different temperature requirements, it has been found that if the water becomes either too hot or too cold, the growth rate of the fish will be substantially reduced while the mortality rate is increased. In addition, if the oxygen content of the water is too low, a decrease in growth rate is experienced, and if the content falls below a set minimum, a high mortality rate will result. In addition to the direct effects of water temperature and oxygen content on fish, there are also indirect effects, in that, undesirable temperatures and oxygen content can materially reduce the production of the natural foods in the water.

There is a tendency for water in small impoundments and those located in hotter climates to thermally stratify. This stratification is characterized by the formation of a hypolimnion layer below a thermocline. In this situation, circulation and mixing of the water above and below the thermocline is effectively non-existent preventing the existence of a homogenous body of water in the impoundment. In fact, wide variations in conditions can exist between the water above and below the thermocline. Normally, in hot weather the water in the hypolimnion layer will have a lower temperature and oxygen content than the water above the thermocline. If left undisturbed over a period of time, the oxygen content of the water in the hypolimnion layer can be very low.

When stratification occurs, it is possible for all the water located above the thermocline to be above the optimum temperature for a given species and that only water in the hypolimnion layer to be at an acceptable temperature. In this situation, the fish will attempt to move into the cooler hypolimnion layer. As the fish attempt to move into the hypolimnion layer, they will be suspended in the low oxygen content water and will either perish or return to the hot water above the thermocline. Thus, the stratification of the lake can materially reduce the usable area of the lake, in that, the fish are confined to that area of the lake which is above the thermocline. In the commercial production of fish in small impoundments, this reduction in usable area can become quite important.

If stratification continues for a period of time, the hypolimnion layer can become oxygen starved to the point that insect larva growth is inhibited. In some cases, it is believed that insect larva consists of eighty percent of the natural food of fish. Therefore, the lack of larva growth in impoundments can substantially increase the amount of supplemental foods which must be supplied to the fish.

In addition, long periods of stratification produce a high biological oxygen demand in the hypolimnion layer. If the impoundment were to mix or "turn over" due to the presence of a cold rain or wind on the surface of the lake, the movement of this water with a high biological oxygen demand to the surface can be tragic in that a fish kill can result. Similar problems can be present in maintaining a fish population by controlling the oxygen content of water in a moving body of water due to such factors as waste oxidation and the like.

The necessity of providing a proper water temperature and oxygen content environment for fish populations has long been recognized. Numerous methods have been suggested to satisfy this need. In one method, destratification is accomplished by removing water from the hypolimnion layer and spraying it into the air for aeration. In another method, water from above the thermocline is pumped down and discharged at a point below the thermocline in the hypolimnion layer. In other methods, the hypolimnion layer is aerated directly. An example of such a system is shown in U.S. Pat. No. 3,643,403 wherein air is bubbled in the water of the hypolimnion layer. The air bubbles are caused to flow downward through a chamber and are released to flow in an upward direction.

Although the above described methods produce aeration of water, they can destroy the extremely valuable reserve of cold water of the hypolimnion layer through destratification of the impoundment.

The method and apparatus of the present invention is especially beneficial in dissolving oxygen at an efficient rate in the water in the hypolimnion layer without disturbing the stratification of the impoundment. In addition, the present invention provides a trapped volume of oxygen submerged in the impoundment which causes an efficient absorption of oxygen by the water through surface contact with the oxygen.

According to a preferred embodiment of the present invention, an apparatus is provided with an open bottom chamber submerged in an impoundment at or near the bottom preferably below the thermocline. Oxygen is supplied to the chamber at a rate equal to the absorption of the oxygen into the water so that gases are not allowed to flow in an upward direction to disturb the thermocline. In another embodiment, flow-inducing means are provided to cause water in the hypolimnion layer to flow past the area of surface contact and are agitated during said flow. Flow of the water is created in a horizontal direction to avoid disturbing the thermocline. In another embodiment, a plurality of these chambers can be vertically spaced in an assembly and submerged in a moving body of water. A plurality of these assemblies can be positioned along the flow path to cause repeated contact until sufficient aeration or oxidation results.

BRIEF DESCRIPTION OF THE DRAWINGS

The objects and advantages of the improved apparatus and method of the present invention will become more apparent from a consideration of the details of construction and operation as hereinafter described in the following specification when considered in connection with the accompanying drawings in which.

DESCRIPTION OF THE PREFERRED EMBODIMENTS

Figure 1:
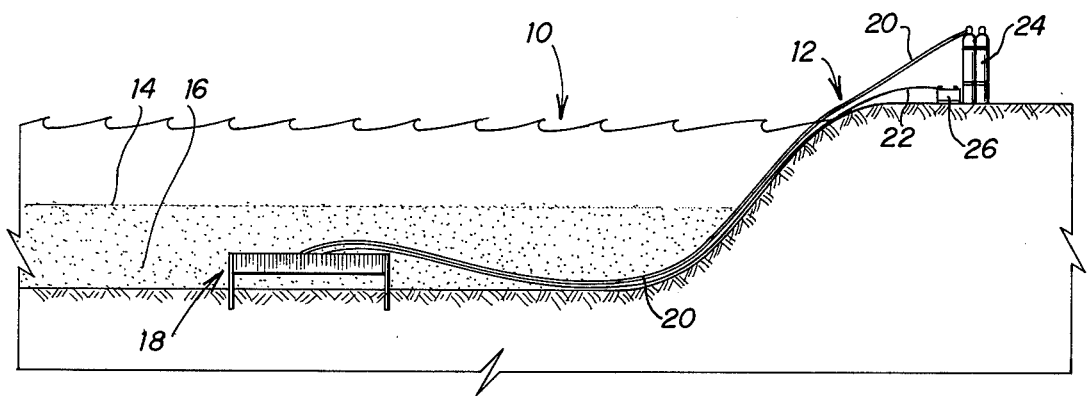
FIG. 1 is a front side elevation view of the apparatus of the present invention installed in an impoundment.
Figure 2:
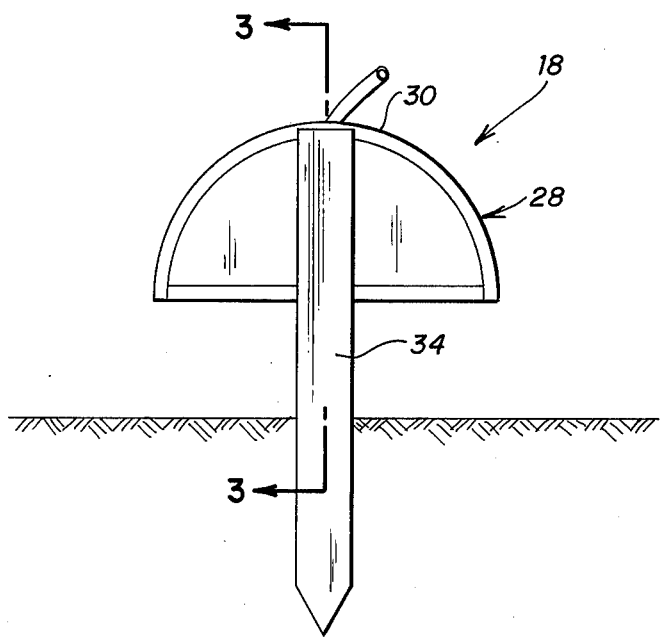
FIG. 2 is a right side elevation view.
Figure 3:
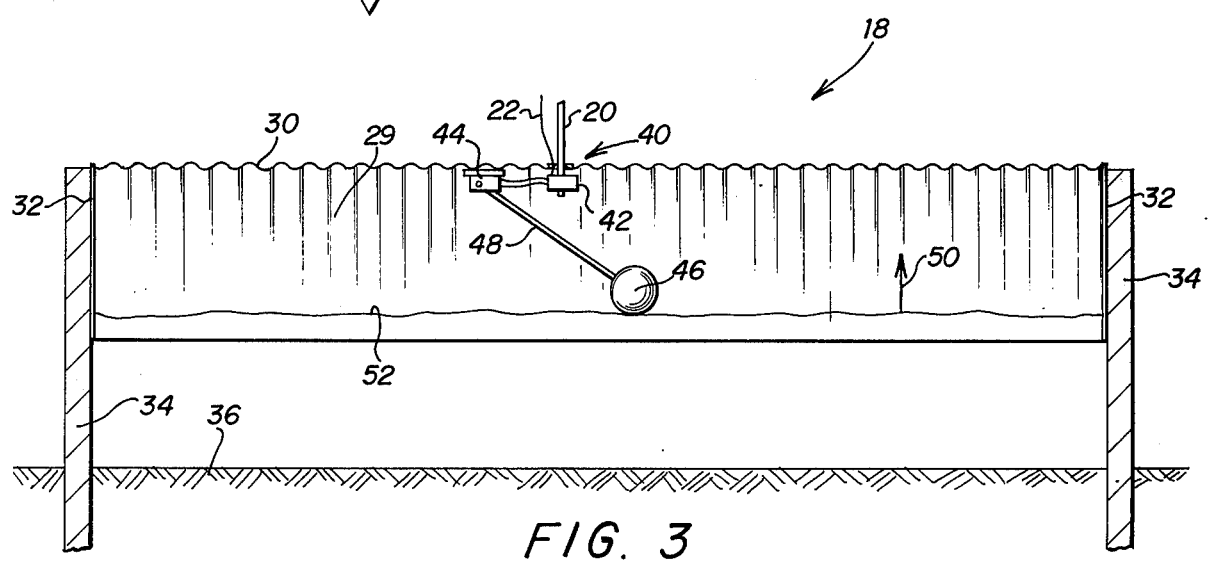
FIG. 3 is a section of the device taken on line 3—3 of FIG. 2 looking in the direction of the arrows.

Referring now to the Drawings wherein like reference characters designate like or corresponding parts, there is illustrated in FIGS. 1 through 3, a stratified impoundment 10 with one embodiment of the improved apparatus 12 of the present invention illustrated installed therein. The impoundment 10 is illustrated in a stratified condition with a thermocline 14 above a hypolimnion layer 16. An oxygen absorption assembly 18 is illustrated attached to the bottom of the impoundment 10 in the hypolimnion layer and is connected by a conduit 20 and conductor 22, to a supply of pressurized oxygen 24 and a source of electrical power 26, respectively. A regulator (not shown) and suitable valving are provided for controlling the pressure and rate of flow of oxygen to said chamber 29.

The assembly 18 has a chamber 29 as will be hereinafter described, which is in surface contact with the water in the hypolimnion layer to transfer oxygen by absorption to the water located therein. The term "absorption" herein is used to indicate the process occurring when water and oxygen are placed in contact and includes, but is not limited to the absorption, and any chemical reactions between the oxygen and the water and other materials in the water. In addition, the term "oxygen" is used throughout the present application to indicate the gaseous state of oxygen, but it is to be understood, of course, that in the appropriate situation, ozone could be utilized. It has also been found desirable to adjust the regulator so that oxygen is supplied to the chamber 29 at a pressure of one-half pound per square inch per foot of depth the receptacle is located.

The supply of oxygen to the assembly 18 is regulated such that the oxygen is introduced into chamber 29 at a rate equal to the absorption of the oxygen by the water. This regulation prevents waste gases from flowing in an upward direction to disturb the thermocline. This regulation allows aeration of the hypolimnion layer while preserving the cool temperature of the water. In addition, this regulation efficiently utilizes oxygen.

The details of construction of the absorption assembly 18 are illustrated in FIG. 2 and 3. This assembly 18 has a receptacle 28 constructed from an arcuate outer wall 30 and two end walls 32. In the preferred embodiment, the wall 30 is constructed from a section of cylindrical corrugated drainage pipe, cut in half along its length. Semicircular end walls 32 are welded to the ends of the section to define an open bottom receptacle. The walls 30 and 32 are preferably constructed from galvanized materials to prevent corrosion.

Anchors 34 can be attached to the end walls 32 and anchored in the bottom 36 of the impoundment 10. These anchors 34 extend a sufficient distance from the bottom to elevate the assembly 18 to the desired depth (preferably below the thermocline).

A valve assembly 40 is provided within the chamber 29 of receptacle 28. This valve assembly 40 has an electrically actuated valve 42 which, when actuated, allows the flow of oxygen from conduit 20 into chamber 29. A switch 44 has a float 46 attached to its actuator arm 48. The switch is in turn connected to valve 42 to open the valve when the float 46 moves in the direction of arrow 50. In this manner, as oxygen is removed from the chamber 29, the water level 52 will rise, causing float 46 to rise, and thus opening the valve 42 and supplying additional oxygen to the chamber 29. The supply of oxygen to chamber 29 will in turn lower the water level 52 and cause float 46 to be lowered, closing valve 42. The electrical power necessary to operate the valve 42 and switch 44 is supplied through conductor 22 from a suitable electrical power source 26, such as a battery.

Thus it can be seen that the apparatus 12 of the present invention places water in the hypolimnion layer 16 in surface contact with a volume of oxygen. The oxygen is absorbed by the water and oxygen is supplied to the receptacle at a rate which is substantially equal to the rate in which oxygen is absorbed by the water. This prevents destratification of the impoundment by excessive gases escaping from the receptacle.

In FIGS. 4–7, a second embodiment of the present invention is illustrated. In this embodiment, a receptacle 60 is formed from galvanized material with a planar upper wall 62 and a lip 64, which extends transverse to the wall 62 around the periphery thereof. This wall 62 and the lip 64 form a chamber 66 which is open at the bottom and in which a volume of oxygen can be trapped. The chamber 66 is shallow in depth and provides a large surface area contact between the oxygen and water. A plurality of stiffening ribs 68 and 69 are attached to the inside of the wall 62 and extend transverse thereto. The ribs 68 are arranged in a spaced parallel relationship and extend across the width of the wall 62. The ribs 69 are arranged in a spaced parallel relationship and extend along the length of the wall 62 to ribs 68 and add rigidity to the receptacle 60. A plurality of ports 70 allow gas flow across the ribs 68 and 69. These ports 70 are located along the upper surfaces of the ribs 68 and 69 adjacent to the wall 62.

A valve assembly 72 is positioned at one side of the receptacle 60. This valve assembly 72 is connected to a conduit 74 which supplies oxygen under pressure to the receptacle 60. The valve assembly 72 has a float member 76 which is attached to the end of an arm 78. The arm 78 has a transversely extending portion 82 which is pivotally attached to a flange 80 on lip 64. A valve member 84 is formed on the end of arm 78 opposite float member 76. A valve seat 86 is formed on the inside of lip 64 and communicates with the conduit 74. In operation, when the valve is in the position illustrated in FIG. 7 in solid lines, valve 84 closes the valve seat 86 and oxygen is prevented from flowing into the chamber 66. If a sufficient quantity of oxygen in chamber 66 is absorbed, the water level 88 will rise causing float 76 to rise (as shown in dotted lines). Arm 78 will also pivot in the direction of arrow 90, moving valve 84 away from the valve seat 86 to allow oxygen to flow into chamber 66 until the water level 88 is lowered to the point where float 76 will cause arm 78 to rotate in the reverse direction of arrow 90 and valve 84 will close valve seat 86.

Figure 6:
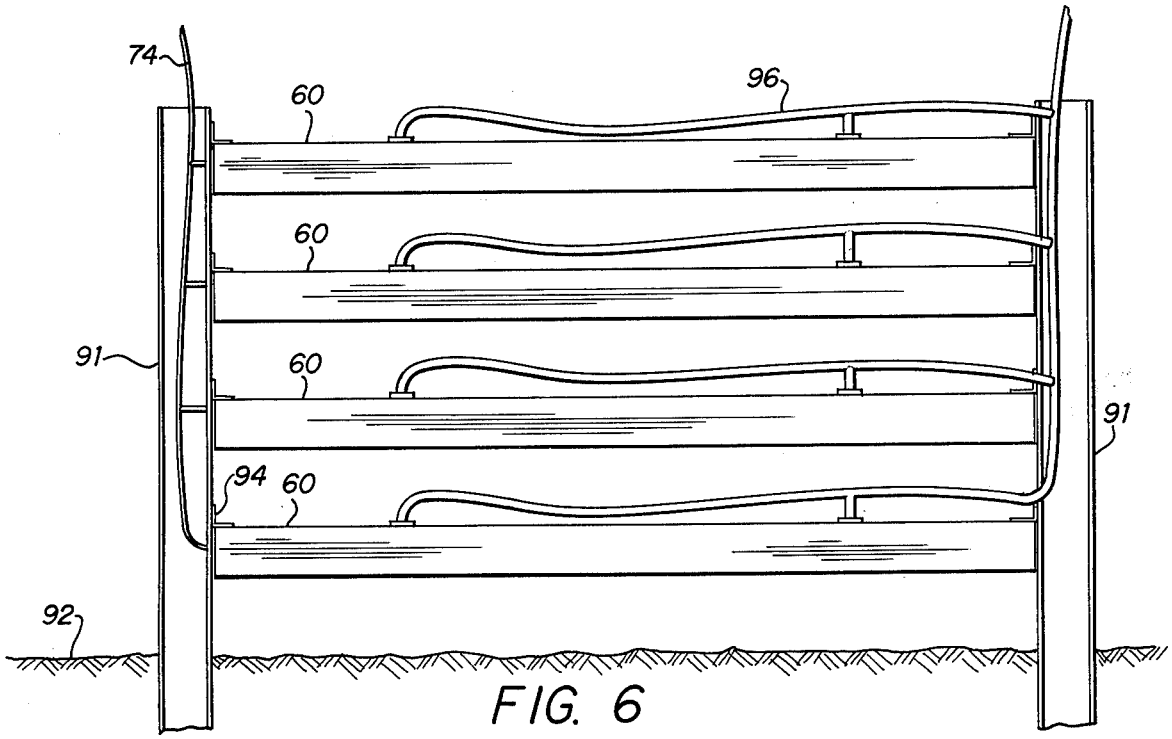
FIG. 6 is a side elevation view of an assembly using the embodiment illustrated in FIG. 4.
Figure 7:
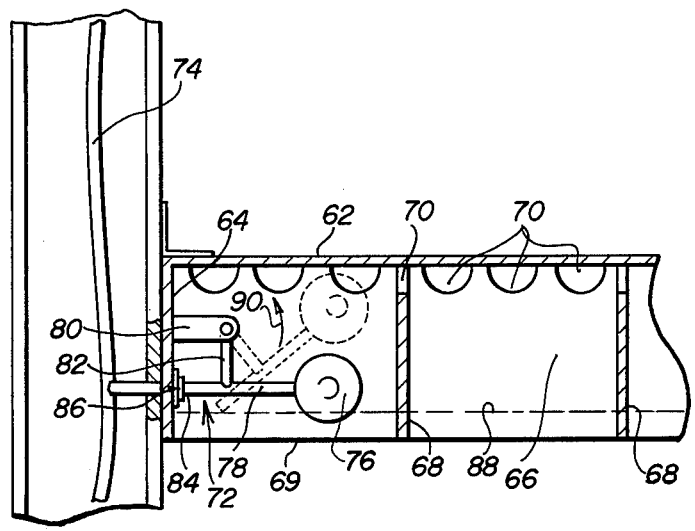
FIG. 7 is an enlarged sectional view of a portion of FIG. 5.

The mounting of this second embodiment can be accomplished as illustrated in FIG. 6. In this embodiment, supports 91 are anchored in the bottom 92 of the impoundment to extend in a vertically upward direction. The conduit 74 can be positioned to extend through the support 91 with the receptacles 60 attached by angle irons 94. The receptacles 60 are spaced in a parallel vertical relationship.

Figure 4:
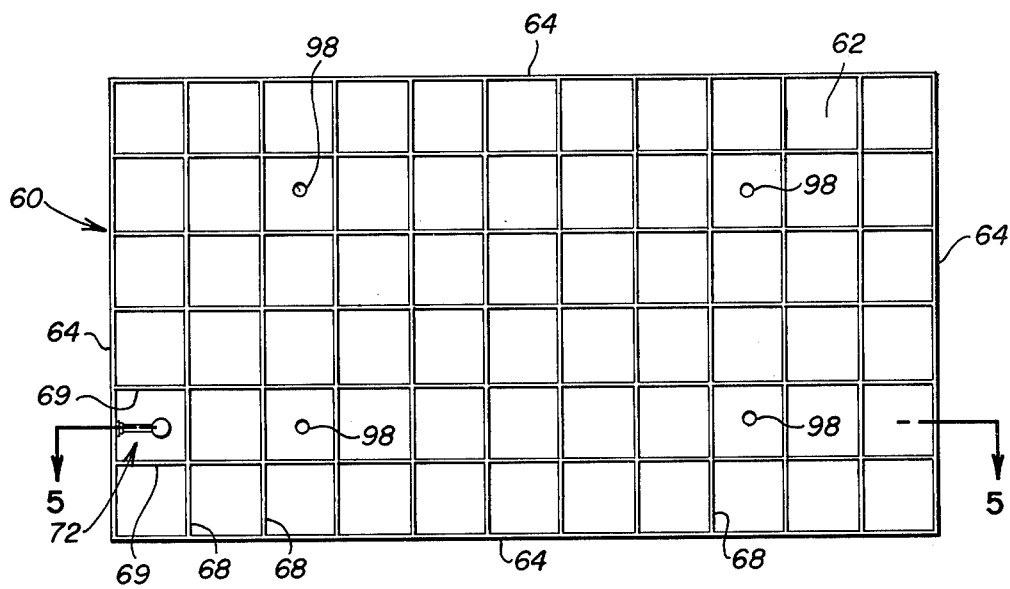
FIG. 4 is a bottom plan view of an alternative embodiment of the present invention.
Figure 5:
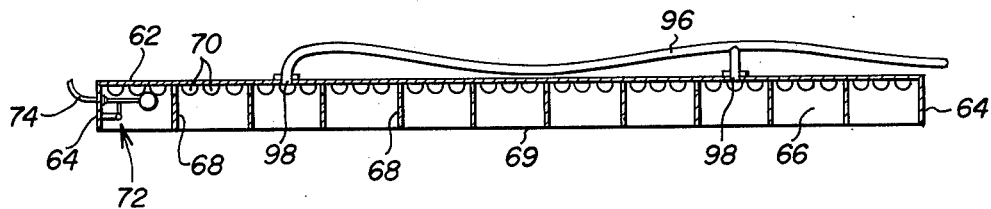
FIG. 5 is a section of the device taken on line 5—5 of FIG. 4 looking in the direction of the arrows.

If the embodiment illustrated in FIGS. 4 through 6 were to be placed in a moving stream of water, a plurality of the assemblies illustrated in FIG. 6, could be spaced along the river bottom to provide repeated aeration of the flowing water. It is also envisioned that this embodiment would have special application in the treatment of sewage. The assemblies could be placed in settling tanks to provide aeration of the sewage therein.

The receptacle 60 is provided with purge lines 96 which communicate with ports 98 positioned in the upper wall 62. The flow of oxygen through purge line 96 can be controlled by a suitable valve positioned outside the water and can be periodically opened to blow out any material which may be trapped within the receptacles 60, such as when the receptacle is placed in a sewage settling tank.

Figure 8:
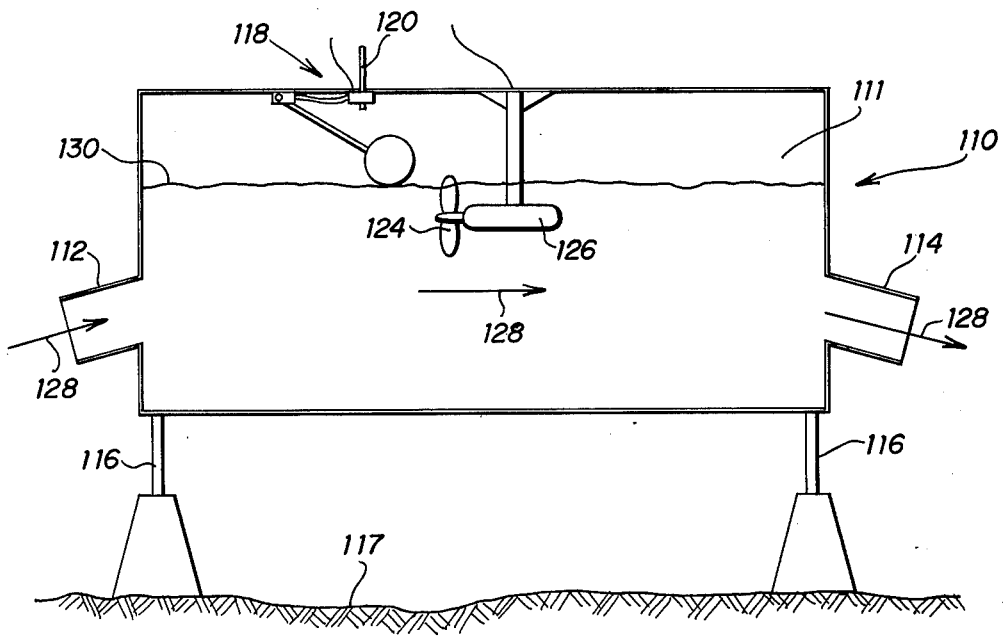
FIG. 8 is a third alternative embodiment.

A third embodiment of the present invention is illustrated in FIG. 8. This embodiment has a receptacle 110 which encloses a chamber 111. Inlet and outlet ports 112 and 114, respectively, are provided to communicate with the chamber 111. This receptacle 110 is submerged in the water of the impoundment and is held in place by means of anchors 116 to the bottom 117. The inlet 112 and outlet 114 are preferably positioned below the thermocline.

A valve assembly 118 is provided in the receptacle 110 and is identical in construction to the valve assembly 40 to regulate the flow of oxygen through conduit 120 to the chamber 111. In addition, an impeller blade 124 is attached to a sealed electrical motor 126 to cause the water to flow through the chamber 122 in the direction of arrows 128. The inlet 112 and outlet 114 are positioned so that the water flow will move either parallel to or away from the thermocline to prevent destratification by the water flow. The impeller 124 is positioned so that agitation of the water will result from rotation of the impeller due to the fact that a portion of the impeller during its normal rotation extends above the surface 130 of the water in the chamber 122.

It should be understood, of course, that the foregoing disclosure relates to only a preferred embodiment of the invention and that numerous modifications and alterations may be made therein without departing from the spirit and scope of the invention as set forth in the appended claims.

What is claimed is:

1. An apparatus for dissolving oxygen within a body of water comprising:

receptacle means immersed in said water for containing a volume of oxygen in quiescent surface contact with said water, said receptacle means comprises a top wall, a lip extending from the periphery of said wall, said lip extending downward, and transverse to said top wall to form an open bottom chamber, means for introducing oxygen within a region of said receptacle means containing said volume of oxygen, said region bounded by said top wall, said lip extending downward from the periphery of said top wall, and the surface of said water underlying said volume of oxygen, thereby supplying oxygen directly to said volume of oxygen and maintaining the quiescent surface contact of said volume of oxygen with said water, float valve means disposed subjacent said top wall for supplying oxygen to said receptacle means at a rate equal to the rate oxygen is absorbed by the water underlying the receptacle means and thereby maintaining a predetermined volume of oxygen in said receptacle means and in substantially quiescent surface contact with the underlying water, said oxygen not exhausting from said receptacle means other than by absorption into the underlying water, and said top wall including a plurality of ribs equally spaced across said top wall for stiffening said wall.

2. The apparatus of claim 1 wherein said float valve means comprises a regulator for supplying said oxygen at a pressure of one-half pound per foot of depth said receptacle means is located below the surface of said body of water.

* * * * *